(12) United States Patent
Han et al.

(10) Patent No.: US 8,550,689 B2
(45) Date of Patent: Oct. 8, 2013

(54) BACKLIGHT ASSEMBLY

(75) Inventors: Sang-Sun Han, Asan-si (KR); Tai-Yun Jung, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/358,603

(22) Filed: Jan. 26, 2012

(65) Prior Publication Data

US 2012/0206940 A1    Aug. 16, 2012

(30) Foreign Application Priority Data

Feb. 14, 2011 (KR) .......... 10-2011-0012782

(51) Int. Cl.
*F21V 33/00*    (2006.01)

(52) U.S. Cl.
USPC ............. 362/634; 362/97.1; 362/632

(58) Field of Classification Search
USPC ......... 362/632, 634, 97.1, 97.2, 97.3
See application file for complete search history.

(56) References Cited

U.S. PATENT DOCUMENTS

| 7,441,938 B2 * | 10/2008 | Sakai et al. ............... 362/634 |
| 7,714,952 B2 * | 5/2010 | Chang ............... 349/58 |
| 2005/0036296 A1 * | 2/2005 | Kim et al. ............... 362/31 |

FOREIGN PATENT DOCUMENTS

| JP | 10096921 A | 4/1998 |
| JP | 2009198670 A | 9/2009 |
| KR | 1020060016542 A | 2/2006 |

\* cited by examiner

*Primary Examiner* — Laura Tso
(74) *Attorney, Agent, or Firm* — Cantor Colburn LLP (57) ABSTRACT

A backlight assembly includes a light emitting part, a light guide plate, a bracket and receiving container. The light emitting part generates light. The light guide plate includes a first side surface which receives the light, and a second side surface adjacent to the first side surface. The bracket is fixed to the second side surface of the light guide plate. The receiving container includes a bottom, and a sidewall perpendicularly extending from the bottom, and receives the light emitting part and the light guide plate. The sidewall includes combining portions which are combined with the bracket.

20 Claims, 7 Drawing Sheets

BACKLIGHT ASSEMBLY

CROSS REFERENCE TO RELATED APPLICATION

This application claims priority under 35 U.S.C. §119 to Korean Patent Application No. 2011-0012782, filed on Feb. 14, 2011 in the Korean Intellectual Property Office (KIPO), the contents of which are herein incorporated by reference in their entireties.

BACKGROUND OF THE INVENTION

1. Field of the Invention

Example embodiments of the invention relate to a backlight assembly. More particularly, example embodiments of the invention relate to a backlight assembly for display apparatus.

2. Description of the Related Art

A backlight assembly providing a display panel of a display apparatus with light may be an edge-illumination type or a direct-illumination type according to a position of a light source. Particularly, the edge-illumination type backlight assembly includes a light guide plate receiving light from the light source, and emitting the light toward a display panel.

However, since the light guide plate is shaped as a plate, the light guide plate may be easily damaged by externally provided vibration and impact, and expanded by heat from the light source. In addition, when the light guide plate moves, the light guide plate or the light emitting part may be damaged. Accordingly, the light guide plate is fixed to and received in a receiving container which receives elements of the display apparatus.

In general, for fixing the light guide plate to the receiving container, one of a groove and a protrusion is formed at a side surface of the light guide plate, and the other is formed at a corresponding position of the receiving container, and the light guide plate and the receiving container are fixed to each other by combining the groove and the protrusion. In addition, a fixing portion, such as a stud, is inserted into the groove of the light guide plate, and the fixing portion is fixed to the receiving container, so that the light guide plate may be fixed to the receiving container.

However, when the groove or the protrusion is formed on the light guide plate, light may spatter or leak at the groove or the protrusion. Accordingly, there is a problem that light efficiency of the display apparatus including the light guide plate may be decreased.

BRIEF SUMMARY OF THE INVENTION

Example embodiments of the invention provide a backlight assembly including a light guide plate with a uniform side surface, and preventing the light guide plate from moving.

In an example embodiment, a backlight assembly includes a light emitting part, a light guide plate, a bracket and a receiving container. The light emitting part generates light. The light guide plate includes a first side surface which receives the light, and a second side surface adjacent to the first side surface. The bracket is fixed to the second side surface of the light guide plate. The receiving container includes a bottom, and a sidewall which perpendicularly extends from the bottom, and receives the light emitting part and the light guide plate. The receiving container includes a combining portion which is combined with bracket.

In an example embodiment, the bracket may include a plate which is fixed to the light guide plate, and a hook portion which protrudes from the plate, and is combined with the combining portion.

In an example embodiment, the hook portion may have a trigonal prism shape which inclinedly protrudes from the plate.

In an example embodiment, the combining portion may be a combining hole, into which the hook portion is inserted, formed on the sidewalls of the receiving container.

In an example embodiment, the combining portion may be a combining groove, into which the hook portion is inserted, formed on the sidewalls of the receiving container.

In an example embodiment, the backlight assembly may further include an adhesive member between the second side surface of the light guide plate and the bracket, and which fixes the bracket to the light guide plate.

In an example embodiment, the adhesive member may be a double-sided tape.

In an example embodiment, the adhesive member may include a poron material.

In an example embodiment, the adhesive member may be elastic.

In an example embodiment, the adhesive member may include a first contact layer which contacts the light guide plate, a second contact layer which contacts the bracket, and a light reflective sheet between the first and second contact layers.

In an example embodiment, the light reflective sheet may include a silver (Ag) material.

In an example embodiment, the light guide plate has a rectangular shape such that a length of the first side surface is greater than a length of the second side surface, and the light emitting part may face the first side surface.

In an example embodiment, the light guide plate has a rectangular shape such that a length of the second side surface is greater than a length of the first side surface, and the light emitting part may face the first side surface.

In an example embodiment, the backlight assembly may further include a dummy bracket which overlaps a corner portion on which the first and second side surfaces of the light guide plate contact each other, and is combined with the receiving container.

In an example embodiment, the dummy bracket may include a first fixing plate which overlaps the first side surface of the light guide plate, a second fixing plate which perpendicularly extends from the first fixing plate, and overlaps the second side surface of the light guide plate, and a dummy bracket fixing plate which extends from the first fixing plate in a direction perpendicular to an extending direction of the sidewall of the receiving container, and is combined with and fixed to the sidewall of the receiving container.

In an example embodiment, the sidewall of the receiving container may include a dummy bracket fixing groove into which the dummy bracket fixing plate is inserted.

In an example embodiment, the backlight assembly may include a contact prevention part which contacts and is between the light guide plate and the sidewall of the receiving container, such that the light guide plate and the sidewalls of the receiving container do not contact each other.

In an example embodiment, the contact prevention part may be respectively adjacent to both of opposing end portions of the light emitting part.

According to example embodiments, when the light guide plate is received in the receiving container, the hook portions of the bracket fixed to the light guide plate combine with the corresponding combining portions on the receiving container. Accordingly, the light guide plate is guided, and fixed to the receiving container without an additional groove or flexion on the light guide plate, and movement of the light guide plate may be reduced or effectively prevented although shock and vibration are provided to the display apparatus.

In addition, since the adhesive member is elastic, a process that combines the bracket with the receiving container using the combining portions, or separates bracket from the receiving container combined therewith, may be easily performed repeatedly.

In addition, since the adhesive member is between the light guide plate and the receiving container, and the adhesive member is elastic, contact between the light guide plate and the receiving container may be reduced or effectively prevented, although the light guide plate is expanded by heat generated from the light emitting part.

BRIEF DESCRIPTION OF THE DRAWINGS

The above and other features of the invention will become more apparent by describing in detailed example embodiments thereof with reference to the accompanying drawings, in which.

DETAILED DESCRIPTION OF THE INVENTION

Hereinafter, example embodiments of the invention will be explained in detail with reference to the accompanying drawings.

Figure 1:
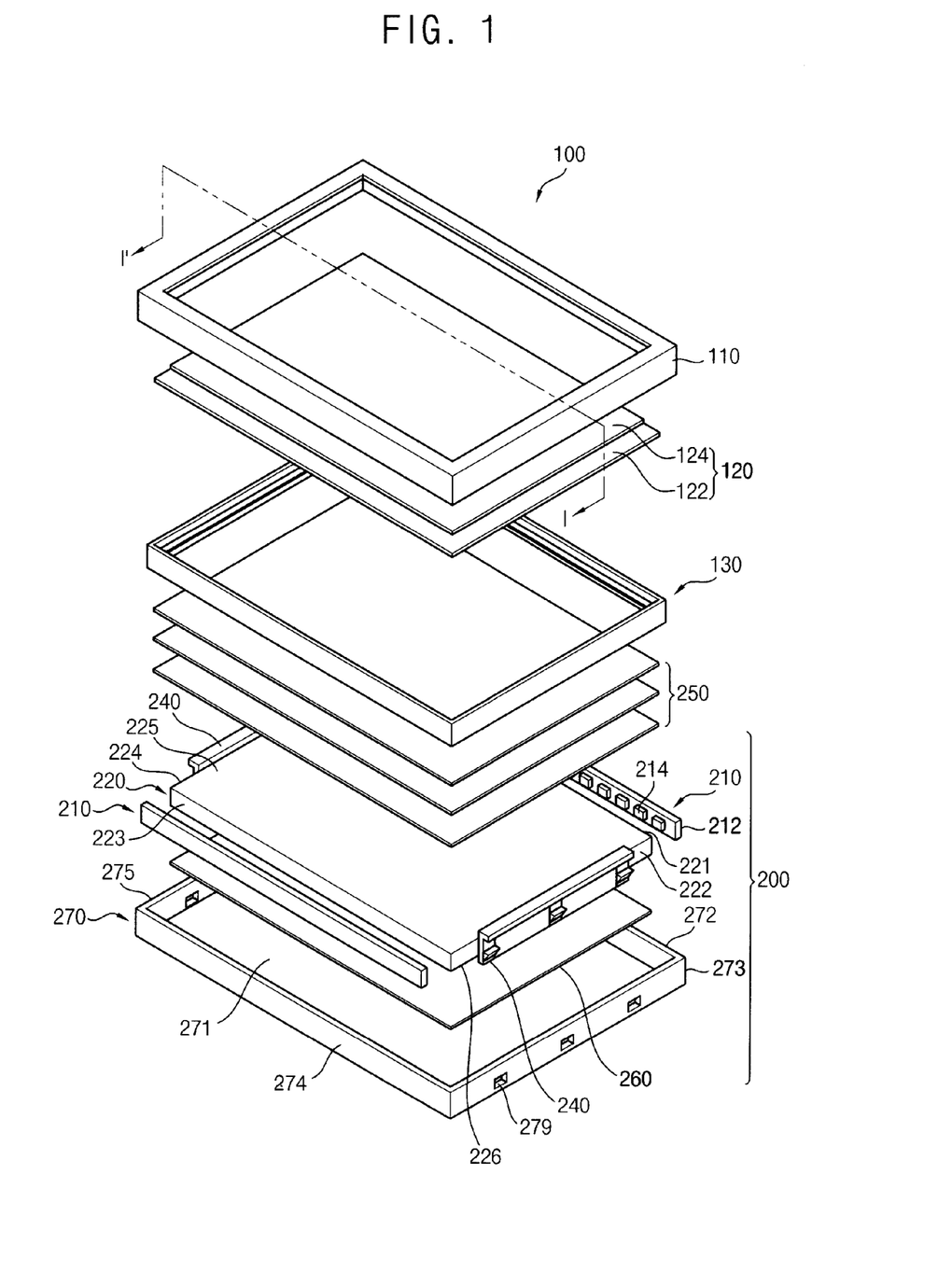
FIG. 1 is an exploded perspective view illustrating an example embodiment of a display apparatus according to the invention.
Figure 2:
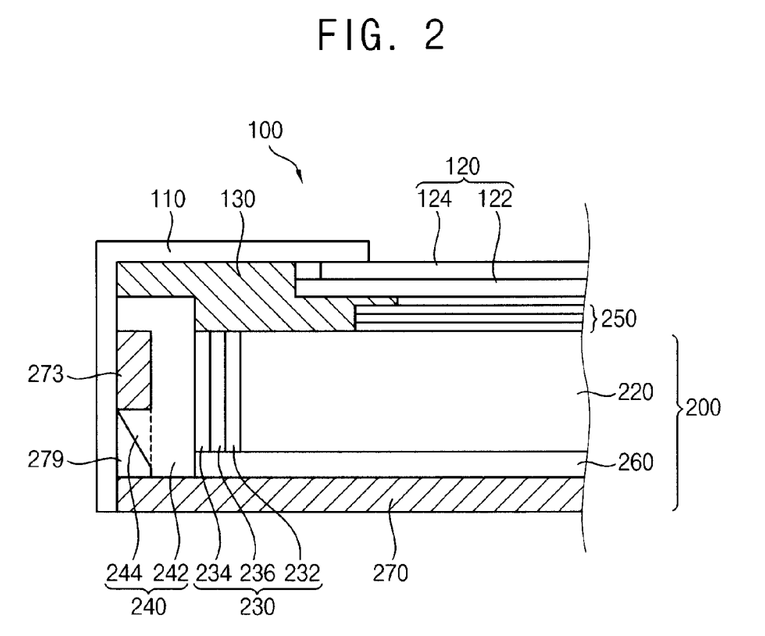
FIG. 2 is a cross-sectional view taken along line I-I' of the display apparatus of FIG. 1.

FIG. 1 is an exploded perspective view illustrating an example embodiment of a display apparatus according to the invention. FIG. 2 is a cross-sectional view taken along line I-I' of the display apparatus of FIG. 1.

Referring to FIGS. 1 and 2, the display apparatus 100 according to the illustrated example embodiment includes a top chassis 110, a display panel 120 and a backlight assembly 200.

The top chassis 110 is disposed on the display panel 120 to protect the display panel 120 from an external impact, and a window extends through the top chassis 110 to expose a display area of the display panel 120.

The display panel 120 includes a first substrate 122, a second substrate 124 facing the first substrate 122, and a liquid crystal layer (not shown) disposed between the first and second substrates 122 and 124. The display panel 120 displays an image using light emitted from a light emitting surface 225 of a light guide plate 220 included in the backlight assembly 200.

The backlight assembly 200 is disposed under and overlapping the display panel 120 to provide the display panel 120 with light. The backlight assembly 200 includes a light emitting part 210, the light guide plate 220, an adhesive member 230, a bracket 240, a reflection sheet 260 and a receiving container 270.

The light emitting part 210 includes a printed circuit board 212 and a plurality of light emitting chips 214. The printed circuit board 212 provides a power source applied from an external to the light emitting chips 214 to drive the light emitting chips 214. The light emitting chips 214 mounted on the printed circuit board 212 receive the power source from the printed circuit board 212, and generate and emit light. In one example embodiment, for example, each of the light emitting chips 214 may be a light emitting diode ("LED").

In the illustrated example embodiment, the light emitting part 210 including the printed circuit board 212 and the light emitting chips 214 is explained as an example, however the light emitting part 210 may be a cold cathode fluorescent lamp ("CCFL"), or a flat fluorescent lamp ("FFL").

The light guide plate 220 has a rectangular shape in a plan view, and includes first, second, third and fourth side surfaces 221, 222, 223 and 224, the light emitting surface 225 and a light reflecting surface 226.

Each of the first and third side surfaces 221 and 223 is longer than the second and fourth side surfaces 222 and 224, and receives light from the light emitting part 210 facing the first and third side surfaces 221 and 223. Each of the second and fourth side surfaces 222 and 224 is a relatively shorter side surface of the light guide plate 220, and is disposed adjacent to both of the first and third side surfaces 221 and 223, and the adhesive member 230 is attached thereto, respectively. The light emitting surface 225 emits a guided light supplied through the first and third side surfaces 221 and 223 to the display panel 120. The light reflecting surface 226 reflects light leaked from the light guide plate 220.

According to the illustrated example embodiment, the two light emitting parts 210 facing with each other are disposed on the first and third side surfaces 221 and 223, respectively, but only one light emitting part may be disposed on one of the first and third side surfaces 221 and 223 in an alternative embodiment. The adhesive member 230 is attached to each of the second and fourth side surfaces 222 and 224 perpendicular to each of the first and third side surfaces 221 and 223 facing the light emitting part 210 in the light guide plate 220, and the bracket 240 is fixed to the light guide plate 220 through the adhesive member 230. The adhesive member 230 has an adhesive material on both sides of the adhesive member 230, and may be elastic. In one example embodiment, for example, the adhesive member 230 may include poron, and a thickness of the adhesive member 230 may be about 1.0 millimeter (mm).

Particularly, the adhesive member 230 may be a double-sided tape including first and second adhesive layers 232 and 234, and a light reflecting layer 236. The thickness of the adhesive member 230 is taken perpendicular to the second and fourth side surfaces 222 and 223, respectively.

The first adhesive layer 232 is attached directly to the second and fourth side surfaces 222 and 224, respectively, in the light guide plate 220. The first adhesive layer 232 may include poron, and may include a transparent material. The second adhesive layer 234 is attached directly to a plate 242 of the bracket 240. The second adhesive layer 234 may include poron, and may include a transparent material. The light reflecting layer 236 is disposed between the first and second adhesive layers 232 and 234, and includes a material reflecting light. In one example embodiment, for example, the light reflecting layer 236 may be a film on which silver (Ag) is deposited.

When the adhesive member 230 attached to the light guide plate 220 includes either a black material, or a material absorbing light provided from the light guide plate 220, there may be a problem that a luminance is deteriorated due to the adhesive member 230.

However, according to the illustrated example embodiment, light provided to the adhesive member 230 passes through the first adhesive layer 232, and then is reflected by the light reflecting layer 236, so that the light may enter the light guide plate 220. Accordingly, the problem of deterioration of the luminance by the adhesive member 230 may be reduce or effectively prevented.

The bracket 240 is a separate element from the light guide plate 220 and is disposed between the adhesive member 230 and sidewalls of the receiving container 270, and is respectively attached to the adhesive members 230 attached to each of the second and fourth side surfaces 222 and 224. The bracket 240 includes the plate 242 and hook portions 244. The plate 242 is attached directly to the adhesive members 230, and the hook portion 244 may be shaped as a trigonal prism inclinedly protruding from an end of the plate 242. In one example embodiment, for example, the number of the hook portions 244 on the one plate 242 may be three. Alternatively, as not limited, the number of the hook portions 244 may be N, wherein N is a natural number. As the plate 242 is shaped as 'L', an upper portion of the plate 242 may be fixed to an upper surface of a sidewall of the receiving container 270. Accordingly, although a space is formed between a bottom 271 of the receiving container 270 and the bracket 240, the bracket 240 may be guided and combined with the receiving container 270. The plate 242 and the hook portion 244 collectively form a single unitary indivisible bracket 240.

The reflecting sheet 260 is disposed between a lower portion of the light guide plate 220 and the receiving container 270, and reflects a leaked light from the light emitting part 210, which is not provided to the light guide plate 220.

The receiving container 270 includes the bottom 271, and first, second, third and fourth sidewalls 272, 273, 274 and 275 perpendicularly extending from four sides of the bottom 271, respectively, to form a receiving space. In one example embodiment, for example, the receiving container 270 may include metal material such as aluminum, and the receiving container 270 receives the reflecting sheet 260, the light guide plate 220, the light emitting part 210 and optical sheets 250.

The receiving container 270 includes combining portions 279 which are combined with portions of the bracket 240. Particularly, the combining portions 279 are combined with corresponding hook portions 244 of the bracket 240, and are on the second and fourth sidewalls 273 and 275 of the receiving container 270. In one example embodiment, for example, the corresponding hook portions 244 are inserted into the combining portions 279, and the combining portions 279 may be combining grooves on each of the second and fourth sidewalls 273 and 275 of the receiving container 270. In one example embodiment, for example, the combining portions 279 may be on each of the second and fourth sidewalls 273 and 275 in a quantity corresponding to the number of the hook portions 244 included in the bracket 240, such as three hook portions 244 per one sidewall. An upper portion of the bracket 240 is fixed to the upper surfaces of the second and fourth sidewalls 273 and 275. Accordingly, although a space is formed between the bottom portion 271 of the receiving container 270 and the bracket 240, the second and fourth sidewalls 273 and 275 may combine with the bracket 240 by guiding a position of the bracket 240.

The display apparatus 100 may further include the optical sheets 250 and a mold frame 130. The optical sheets 250 are disposed between the backlight assembly 200 and the display panel 120, so that an incident efficiency of light provided from the backlight assembly 200 is increased. The optical sheets 250 may include a diffusion sheet, a prism sheet and/or a light-condensing sheet. The mold frame 130 is disposed between the display panel 120 and the optical sheets 250, so that the mold frame 130 supports the display panel 120, and fixes the light guide plate 220, the optical sheets 250 and the reflecting sheet 260 to the receiving container 270.

According to the illustrated example embodiment, when the light guide plate 220 is received in the receiving container 270, the hook portions 242 of the bracket 240 fixed to the light guide plate 220 combine with the corresponding combining portions 279 on the receiving container 270. Accordingly, the light guide plate 220 is guided, and fixed to the receiving container 270 without an additional groove or a flexion on the light guide plate 220, and movement of the light guide plate 220 may be reduced or effectively prevented although shock and vibration are provided to the display apparatus 100.

In addition, since the adhesive member 230 is elastic, a process that combines the bracket 240 with the receiving container 270 using the combining portions 279, or separates the bracket 240 from the receiving container 270, may be easily performed repeatedly. That is, the bracket 240 is removably disposed with the receiving container 270.

In addition, since the adhesive member 230 is disposed between the light guide plate 220 and the receiving container 270, and the adhesive member 230 is elastic, contact between the light guide plate 220 and the receiving container 270 may be reduced or effectively prevented, although the light guide plate 220 is expanded by heat generated from the light emitting part 210.

Figure 3:
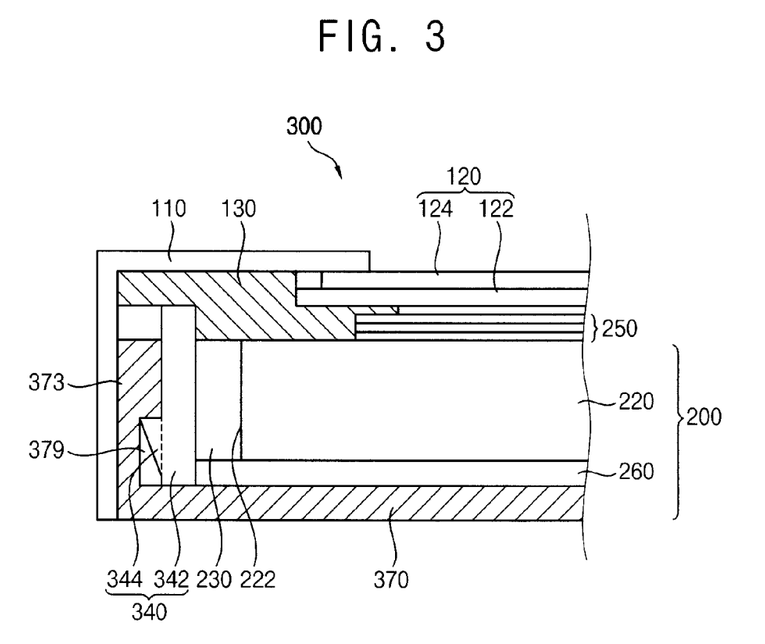
FIG. 3 is a cross-sectional view illustrating another example embodiment of a display apparatus according to the invention.

FIG. 3 is a cross-sectional view illustrating another example embodiment of a display apparatus according to the invention.

A display apparatus 300 according to the illustrated example embodiment is substantially same as the display apparatus 100 shown in FIG. 2 except for a bracket 340 and a receiving container 370. Accordingly, the same reference numerals will be used to refer to the same or like parts as those illustrated in FIG. 2 and any further repetitive explanation concerning the above elements will be omitted.

Referring to FIG. 3, according to the illustrated embodiment, the bracket 340 is disposed between sidewalls of the receiving container 370 and the adhesive member 230, respectively, and the light guide plate 220 is attached to the adhesive member 230 on each of the second and fourth side surfaces 222 and 224. The bracket 340 includes a plate 342 and hook portions 344. The plate 342 is attached directly to the adhesive member 230, and the hook portions 344 may be shaped as a trigonal prism inclinedly protruding from an end of the plate 342. A protruding length of the each hook portion 344 may be smaller than that of the hook portion 244 illustrated in FIG. 2. Thus, the bracket 340 may combine with the sidewalls of the receiving container 370 through combining grooves of the receiving container 370, which will be explained below in detail.

The receiving container 370 includes combining portions 379 which are combined with the bracket 340. Particularly, the combining portions 379 which are combined with corresponding hook portions 344 of the bracket 340 are on a second sidewall 373 of the receiving container 370 facing the bracket 340. In one example embodiment, for example, the corresponding hook portions 344 are inserted into the combining portions 379, and the combining portions 379 may be combining grooves on each of the second sidewall 373 of the receiving container 370.

As the plate 344 is shaped as 'L', an upper portion of the plate 344 may be fixed to an upper surface of the second sidewall 373 of the receiving container 370. Accordingly, the bracket 340 may be guided, and be combined with the receiving container 370 by the second sidewall 373.

According to the illustrated example embodiment, the combining grooves 379 extend from an inner surface of respective sidewalls of the receiving container 370 and partially through a thickness of the sidewalls, and are combined with the corresponding hook portions 344, so that the light guide plate 220 is guided, and fixed to the receiving container 370 while maintaining a continuous outside surface of the receiving container 370 uniformly. In contrast, the combining portion 279 in FIG. 2 extends completely through a thickness of the second sidewall 273, such that the outside surface of the receiving container 270 is discontinuous.

Figure 4:
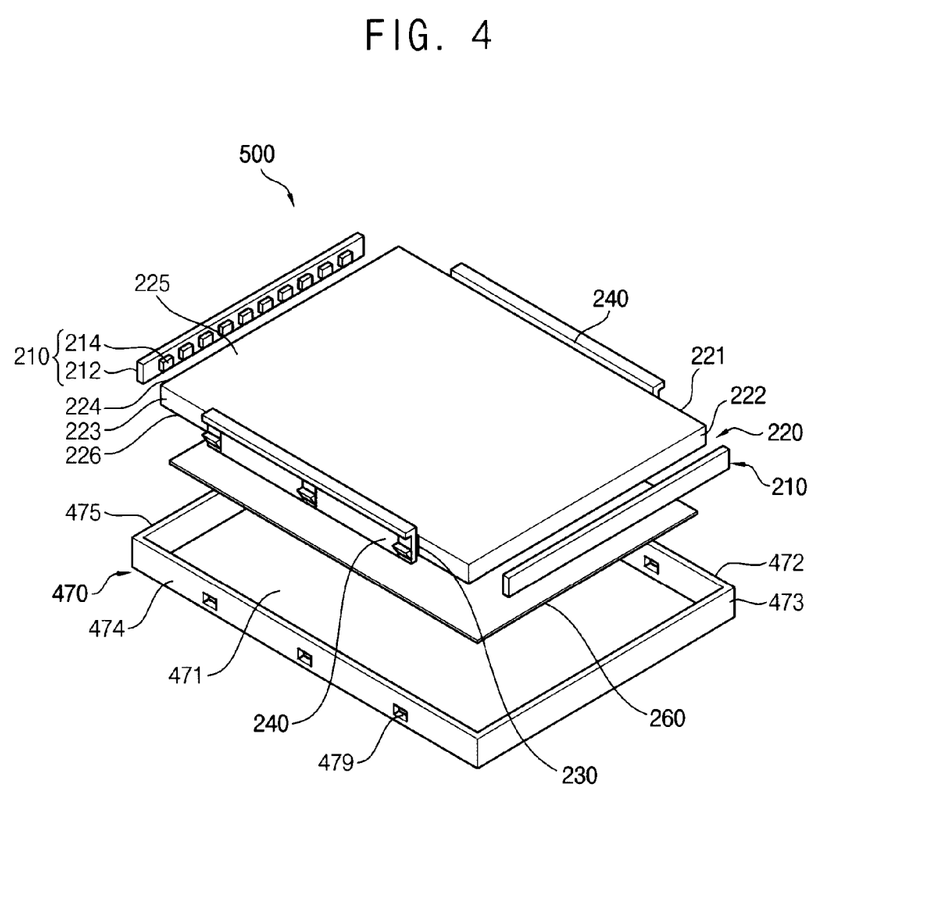
FIG. 4 is an exploded perspective view illustrating still another example embodiment of a display apparatus according to the invention.

FIG. 4 is an exploded perspective view illustrating still another example embodiment of a display apparatus according to the invention.

A backlight assembly 500 according to the illustrated example embodiment may be included in a display apparatus, and the display apparatus including the backlight assembly 500 is substantially same as the display apparatus 100 illustrated in FIGS. 1 and 2 except for positions of the adhesive member 230 and the bracket 240, and a receiving container 470. Accordingly, the same reference numerals will be used to refer to the same or like parts as those illustrated in FIGS. 1 and 2 and any further repetitive explanation concerning the above elements will be omitted.

Referring to FIG. 4, the light guide plate 220 has a rectangular shape in a plan view, and each of the first and third side surfaces 221 and 223 is longer than the second and fourth side surfaces 222 and 224, and the adhesive member 230 is attached thereto, respectively. The bracket is fixed to each of the longer first and third side surfaces 221 and 223. The light emitting part 210 is disposed on each of the shorter second and fourth side surfaces 222 and 224.

According to the illustrated example embodiment, the two light emitting parts 210 are disposed on the second and fourth side surfaces 222 and 224 respectively facing each other, but only one light emitting part may be disposed on one of the second and fourth side surfaces 222 and 224 in an alternative embodiment.

The receiving container 470 includes a bottom 471, and first, second, third and fourth sidewalls 472, 473, 474 and 475, and combining portions 479 which are combined with corresponding hook portions 244 of the bracket 240 are on the longer first and third sidewalls 472 and 474 of the receiving container 470. The combining portions 479 may be combining holes or combining grooves.

According to the illustrated example embodiment, since the light emitting parts 210 are disposed on relatively shorter sides of the light guide plate 220 facing each other, and the bracket 240 is fixed to each of relatively longer sides of the light guide plate 220, the light guide plate 220 is firmly attached to the receiving container 470.

Figure 5:
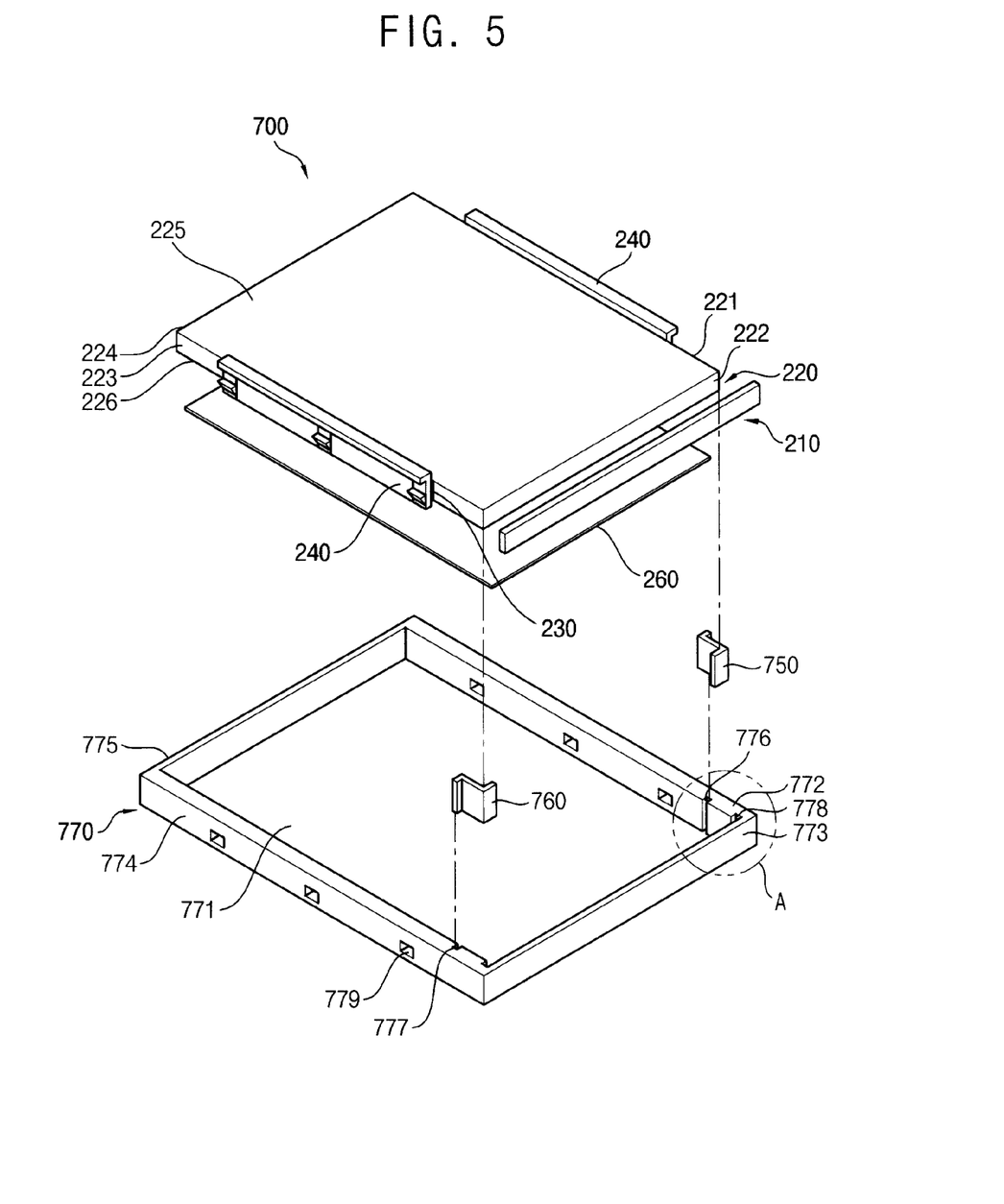
FIG. 5 is an exploded perspective view illustrating still another example embodiment of a display apparatus according to the invention.
Figure 6:
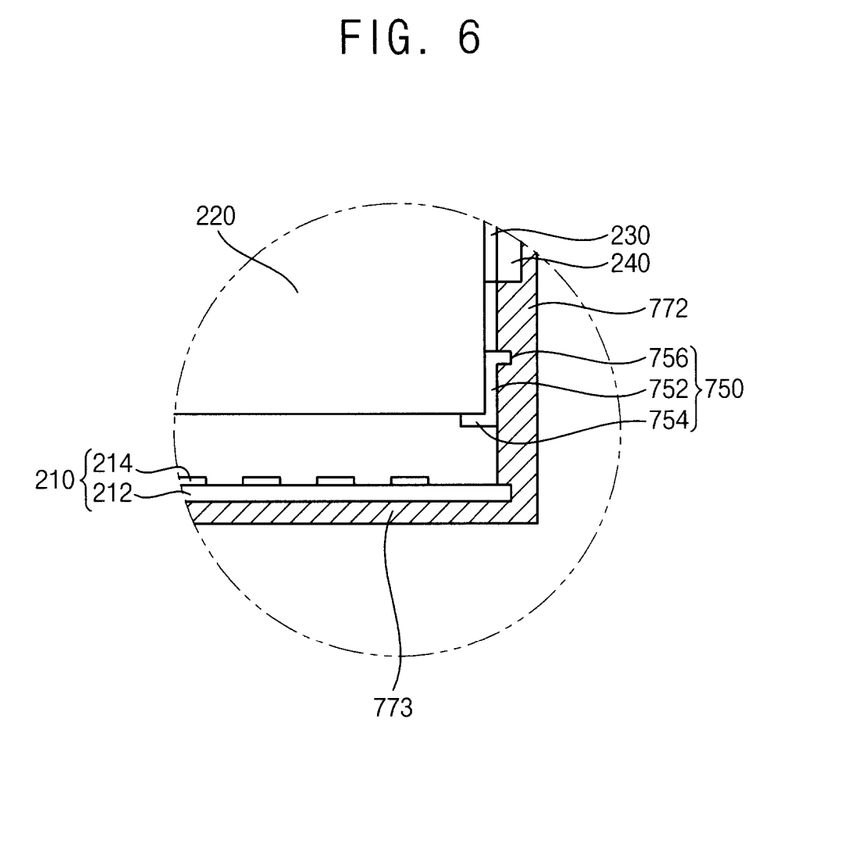
FIG. 6 is an enlarged plan view of portion 'A' in FIG. 5.

FIG. 5 is an exploded perspective view illustrating still another example embodiment of a display apparatus according to the invention. FIG. 6 is an enlarged plan view of portion 'A' in FIG. 5.

A backlight assembly 700 according to the illustrated example embodiment may be included in a display apparatus, and the display apparatus including the backlight assembly 700 is substantially same as the display apparatus 100 illustrated in FIG. 1 except for backlight assembly 200 of the display apparatus 100. In addition, the backlight assembly 700 according to the illustrated example embodiment is substantially same as the backlight assembly 500 illustrated in FIG. 4 except for further including first and second dummy brackets 750 and 760, and a receiving container 770 having a different structure. Accordingly, the same reference numerals will be used to refer to the same or like parts as those illustrated in FIG. 4 and any further repetitive explanation concerning the above elements will be omitted.

Referring to FIG. 5, the backlight assembly 700 according to the illustrated example embodiment includes the light emitting part 210, the light guide plate 220, the adhesive member 230, the bracket 240, the reflecting sheet 260, the receiving container 770, and the first and second dummy brackets 750 and 760.

The first and second dummy brackets 750 and 760 cover corner portions of the light guide plate 220, and fix the light guide plate 220 to the receiving container 770. In one example embodiment, for example, the first and second dummy brackets 750 and 760 may be disposed on corner portions of a side surface of the light guide plate 220 on which the light emitting part 210 is disposed.

Particularly, the first dummy bracket 750 covers a corner portion on which the first and second side surfaces 221 and 222 make contact with each other, and fixes the light guide plate 220 in the receiving container 770. The second dummy bracket 760 covers a corner portion on which the second and third side surfaces 222 and 223 make contact with each other, and fixes the light guide plate 220 in the receiving container 770.

The receiving container 770 includes a bottom 771, and first, second, third and fourth sidewalls 772, 773, 774 and 775, first and second dummy bracket fixing grooves 776 and 777, a light emitting part fixing groove 778 and combining portions 779.

A receiving space is formed by the bottom portion 771 and the first, second, third and fourth sidewalls 772, 773, 774 and 775, and the receiving container 770 receives the light emitting part 210, the light guide plate 220, the adhesive member 230, the bracket 240 and the reflection sheet 260.

The first bracket fixing groove 776 is on the first sidewall 772, and fixes the first dummy bracket 750. The second dummy bracket fixing groove 777 is on the third sidewall 774, and fixes the second dummy bracket 760. Each of the first and second bracket fixing grooves 776 and 777 extend from an inner surface of the respective sidewall of the receiving container 770, and partially through a thickness of the sidewall.

The light emitting part fixing groove 778 fixes the light emitting part 210 to the receiving container 770, so that movement of the light guide plate 220 may be reduced or effectively prevented. The bracket 240 attached to the light guide plate 220 combines with the corresponding combining portion 779.

The first dummy bracket 750 includes first and second fixing plates 752 and 754 and a dummy bracket fixing plate 756. The first fixing plate 752 is disposed between the first side surface 221 of the light guide plate 220 and the first sidewall 772 of the receiving container 770, and fixes the light guide plate 220. The second fixing plate 754 perpendicularly extends from the first fixing plate 752 to cover (e.g., overlap) the second side surface 222 of the light guide plate 220 which is adjacent to the first side surface 221, and fixes the light guide plate 220. The dummy bracket fixing plate 756 perpendicularly extends from the first fixing plate 752 in a direction perpendicular to an extending direction of a nearest sidewall of the receiving container 770, and combines with the first bracket fixing groove 776 to fix the light guide plate 220. The first and second fixing plates 752 and 754, and the dummy bracket fixing plate 756 collectively form a single unitary indivisible first dummy bracket 750.

A configuration and a function of the second dummy bracket 760 are substantially same as those of the first dummy bracket 750, and any further repetitive explanation will be omitted.

According to the illustrated example embodiment, the one light emitting part 210 faces the second side surface 222 of the light guide plate 220, however, the light emitting part 210 may further face the fourth side surface 224 of the light guide plate 220. Accordingly, the receiving container 770 may further include the additional first and second dummy brackets 750 and 760, the additional first and second dummy bracket fixing grooves 776 and 777 and the additional light emitting part fixing groove 778.

According to the illustrated example embodiment, the bracket 240 attached to the light guide plate 220 is attached to the receiving container 770, and corner portions of the light guide plate 220 are covered and fixed by the first and second dummy brackets 750 and 760. Accordingly, the light guide plate 220 may be guided, and fixed to the receiving container 770 without an additional groove or flexion on the light guide plate 220, and moving of the light guide plate 220 may be further prevented compared to the backlight assembly 500 shown in FIG. 4, although shock and vibration generated from an external are provided to the display apparatus.

Figure 7:
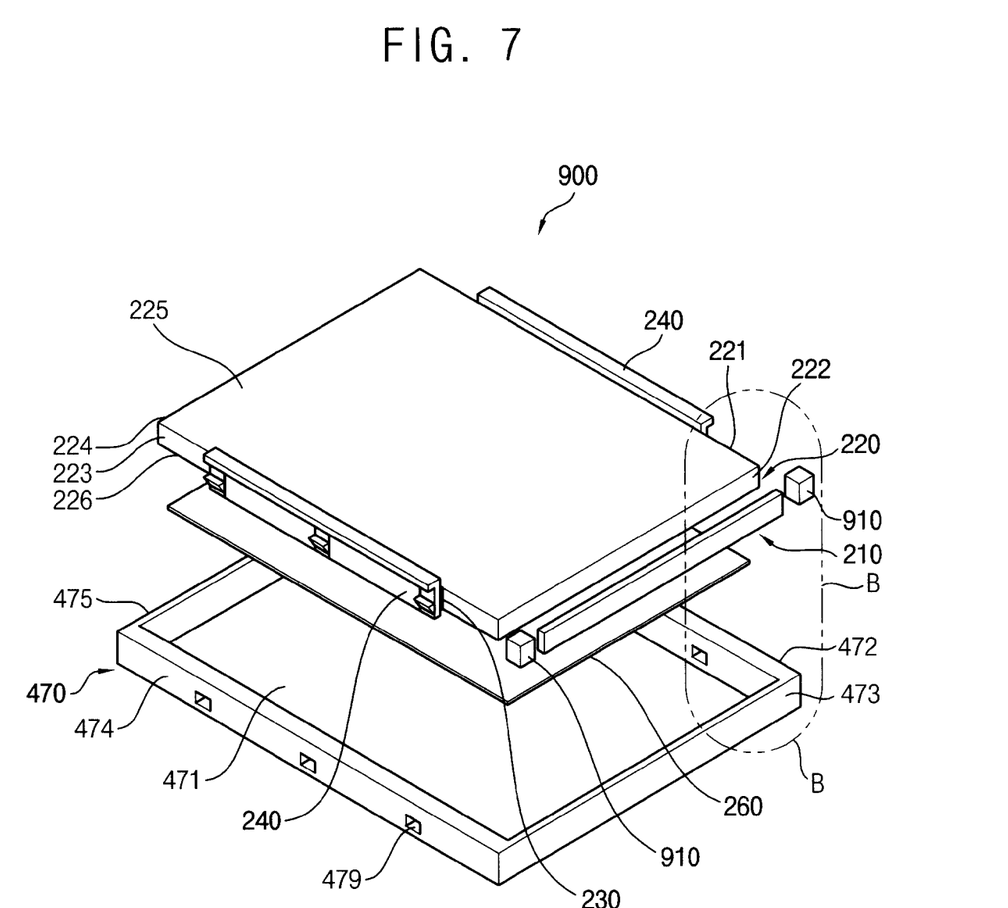
FIG. 7 is an exploded perspective view illustrating still another example embodiment of a display apparatus according to the invention.
Figure 8:
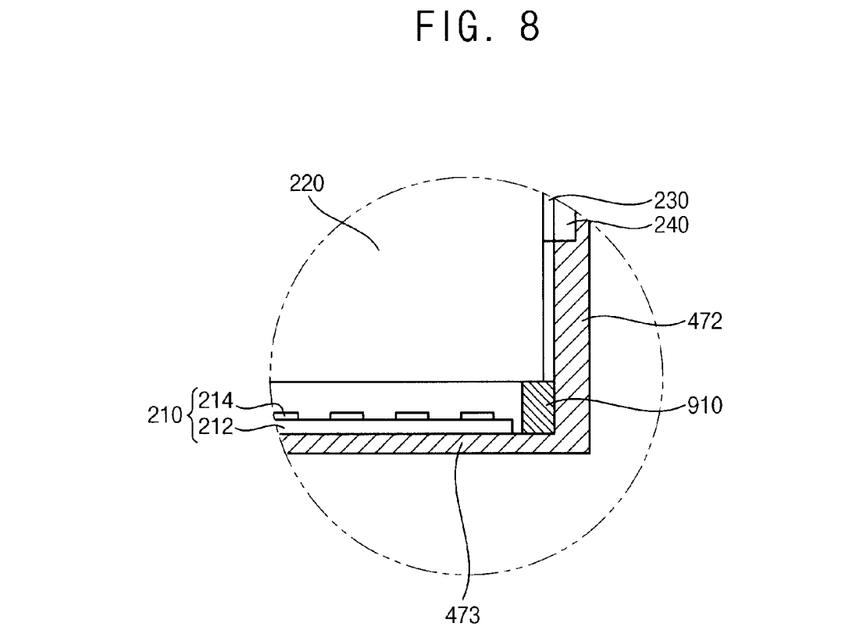
FIG. 8 is an enlarged plan view of portion 'B' in FIG. 7.

FIG. 7 is an exploded perspective view illustrating still another example embodiment of a display apparatus according to the invention. FIG. 8 is an enlarged plan view of portion 'B' in FIG. 7.

A backlight assembly 900 according to the illustrated example embodiment may be included in a display apparatus, and the display apparatus including the backlight assembly 900 is substantially same as the display apparatus 100 illustrated in FIG. 1 except for the backlight assembly 200 of the display apparatus 100. In addition, the backlight assembly 900 according to illustrated example embodiment is substantially same as the backlight assembly 500 illustrated in FIG. 4, except for including only one light emitting part 210, and further including a contact prevention part 910. Accordingly, the same reference numerals will be used to refer to the same or like parts as those illustrated in FIG. 4 and any further repetitive explanation concerning the above elements will be omitted.

Referring to FIGS. 7 and 8, the backlight assembly 900 according to the illustrated example embodiment includes the one light emitting part 210, the light guide plate 220, the adhesive member 230, the bracket 240, the reflecting sheet 260, the receiving container 470, and the contact prevention part 910.

The contact prevention part 910 is respectively disposed adjacent to both end portions of the light emitting part 210, between the receiving container 470 and light guide plate 220. The contact prevention part 910 has relatively a wide width compared to that of the light emitting part 210, and makes contact with the light guide plate 220 and the second sidewall 473 of the receiving container 470 simultaneously, so that contact between the light guide plate 220 and the light emitting part 210 may be reduced or effectively prevented. The thicknesses of the contact prevention part 910 and the light emitting part 210 are taken perpendicular to an extension direction of the second sidewall 473. In one example embodiment, for example, the contact prevention part 910 may include a silicon.

According to the illustrated example embodiment, one light emitting part 210 faces the second side surface 222 of the light guide plate 220, however, the light emitting part 210 may further face the fourth side surface 224 of the light guide plate 220 in an alternative embodiment. Accordingly, the contact prevention part 910 may be further disposed adjacent to both end portions of the light emitting part 210 facing the fourth side surface 224 of the light guide plate 220, and between the receiving container 470 and light guide plate 220.

According to the illustrated example embodiment, even if the light guide plate 220 is expanded by heat generated from the light emitting part 210, contact between the light guide plate 220 and the light emitting part 210 may be reduced or effectively prevented. Accordingly, damage of the light emitting part 210 due to an expansion of the light guide plate 220 may be reduced or effectively prevented.

Figure 9:
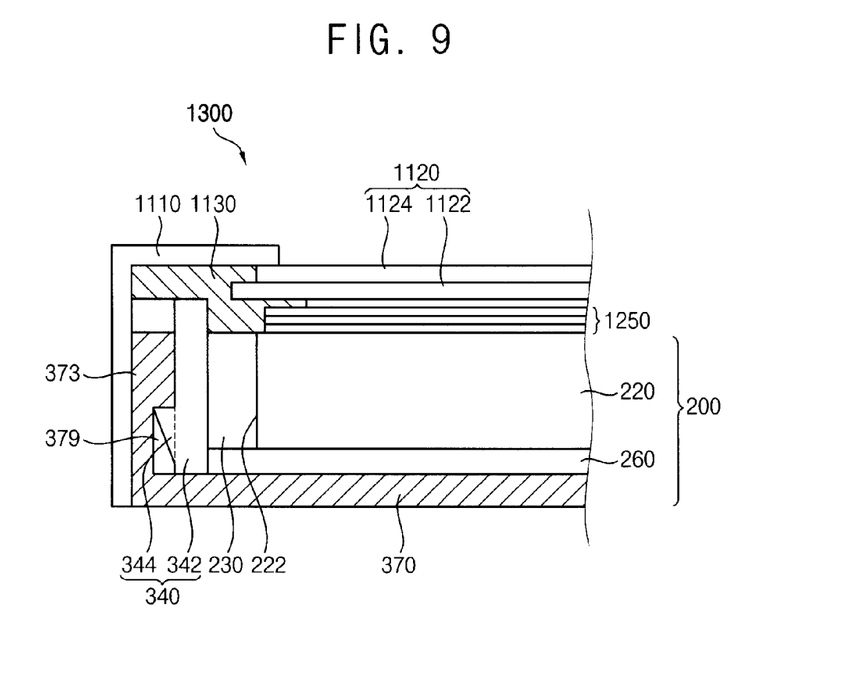
FIG. 9 is a cross-sectional view illustrating still another example embodiment of a display apparatus according to the invention.

FIG. 9 is a cross-sectional view illustrating still another example embodiment of a display apparatus according to the invention.

A display apparatus 1300 according to the illustrated example embodiment is substantially same as the display apparatus 300 shown in FIG. 3, except for a display panel 1120, optical sheets 1250, a mold frame 1130 and a top chassis 1110. Accordingly, the same reference numerals will be used to refer to the same or like parts as those illustrated in FIG. 3 and any further repetitive explanation concerning the above elements will be omitted.

Referring to FIG. 9, since the second side surface 222 is an incident surface of the light guide plate 220, and uniformly flat without groove and flexion, a display area where first and second substrates 1122 and 1124 in the display panel 1120 overlap with each other may extend to the second side surface 222 of the light guide plate 220. Particularly, a non-display area where the first and second substrates 1122 and 1124 in the display panel 1120 do not overlap with each other may overlap with the adhesive member 230, and an end side surface of the second substrate 1124 and the second side surface 222 of the light guide plate 220 may be substantially on the same plane.

The optical sheets 1250 are disposed on the display area where the first and second substrates 1122 and 1124 overlap with each other, between the backlight assembly 200 and the display panel 1120, so that a light efficiency incident from the backlight assembly 200 is increased.

A portion of the mold frame 1130 is disposed between the display panel 1120 and the optical sheets 1250, and supports the display panel 1120. Furthermore, the mold frame 1130 fixes the light guide plate 220, the optical sheets 1250 and the reflective sheet 260 to the receiving container 270.

According to the illustrated example embodiment, since the display area of the display panel 1120 may extend to the side surface 222 of the light guide plate 220, a narrow bezel display apparatus may be implemented by reducing a width of the top chassis 1110.

According to the details described above, when a light guide plate is received in a receiving container, hook portions of a separate bracket attached to the light guide plate combines with corresponding combining portions of the receiving container. Accordingly, the light guide plate is guided, and fixed to the receiving container without an additional groove or a flexion in or on the light guide plate, and movement of the light guide plate may be reduced or effectively prevented although shock and vibration are provided to the display apparatus.

In addition, since an adhesive member between the light guide plate and the bracket is elastic, a process that combines the bracket with the receiving container using the combining portions, or separates the bracket from the receiving container, may be easily performed repeatedly.

In addition, a contact prevention part is between the light guide plate and the receiving container, and is elastic. Even if the light guide plate is expanded by heat generated from the light emitting part, contact between the light guide plate and the light emitting part may be reduced or effectively prevented.

In addition, a side surface of the light guide plate is uniformly flat, and a display area extends to the side surface of the light guide plate. Accordingly, a narrow bezel display apparatus may be implemented.

The foregoing is illustrative of the invention and is not to be construed as limiting thereof. Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific example embodiments disclosed, and that modifications to the disclosed example embodiments, as well as other example embodiments, are intended to be included within the scope of the appended claims. The invention is defined by the following claims, with equivalents of the claims to be included therein.

What is claimed is:

1. A backlight assembly comprising:
    a light emitting part which generates a light;
    a light guide plate comprising:
        a light emitting surface, and a bottom surface opposing the light emitting surface; and
        a first side surface which receives the light generated from the light emitting part, and a second side surface adjacent to the first side surface, wherein the first and second side surfaces connect the light emitting and bottom surfaces to each other;
    a bracket which is fixed to the second side surface of the light guide plate; and
    a receiving container comprising a bottom, and sidewall which perpendicularly extends from the bottom, wherein the receiving container receives the light emitting part and the light guide plate, and the sidewall includes a combining portion which is combined with the bracket.

2. The backlight assembly of claim 1, wherein the bracket comprises:
    a plate which is fixed to the light guide plate; and
    a hook portion which protrudes from the plate, and is combined with the combining portion of the receiving container.

3. The backlight assembly of claim 2, wherein the hook portion has a trigonal prism shape which inclinedly protrudes from the plate.

4. The backlight assembly of claim 2, wherein the combining portion of the receiving container is a combining hole, into which the hook portion of the bracket is inserted, formed on the sidewall of the receiving container.

5. The backlight assembly of claim 2, wherein the combining portion of the receiving container is a combining groove, into which the hook portion is inserted, formed on the sidewall of the receiving container.

6. The backlight assembly of claim 1, further comprising:
    an adhesive member between the second side surface of the light guide plate and the bracket, and which fixes the bracket to the light guide plate.

7. The backlight assembly of claim 6, wherein the adhesive member is a double-sided tape.

8. The backlight assembly of claim 6, wherein the adhesive member comprises a poron material.

9. The backlight assembly of claim 6, wherein the adhesive member is elastic.

10. The backlight assembly of claim 6, wherein the adhesive member comprises:
    a first contact layer which contacts the light guide plate;
    a second contact layer which contacts the bracket; and
    a light reflective sheet between the first and second contact layers.

11. The backlight assembly of claim 10, wherein the light reflective sheet comprises a silver material.

12. The backlight assembly of claim 1, wherein the light guide plate has a rectangular shape such that a length of the first side surface is greater than a length of the second side surface, and the light emitting part faces the first side surface.

13. The backlight assembly of claim 1, wherein the light guide plate has a rectangular shape such that a length of the second side surface is greater than a length of the first side surface, and the light emitting part faces the first side surface.

14. The backlight assembly of claim 1, further comprising:
    a dummy bracket which overlaps a corner portion on which the first and second side surfaces of the light guide plate contact each other, and is combined with the receiving container.

15. The backlight assembly of claim 14, wherein the dummy bracket comprises:
    a first fixing plate which overlaps the first side surface of the light guide plate;
    a second fixing plate which perpendicularly extends from the first fixing plate, and overlaps the second side surface of the light guide plate; and
    a dummy bracket fixing plate which extends from the first fixing plate in a direction perpendicular to an extending direction of the sidewall of the receiving container, and is combined with and fixed to the sidewall of the receiving container.

16. The backlight assembly of claim 15, wherein the sidewall of the receiving container comprises a dummy bracket fixing groove into which the dummy bracket fixing plate is inserted.

17. The backlight assembly of claim 1, further comprising:
    a contact prevention part which contacts and is between the light guide plate and the sidewall of the receiving container, such that the light guide plate and the sidewall of the receiving container do not contact each other.

18. The backlight assembly of claim 17, wherein the contact prevention part is respectively adjacent to both of opposing end portions of the light emitting part.

19. A method of forming a backlight assembly, the method comprising:
    preparing a receiving container including a sidewall which is extended from a bottom portion, and a combining member which is extended into a thickness of the sidewall from an inner surface thereof;
    attaching a bracket to a first side surface of a light guide plate which does not receive light from a light source;
    disposing the light source facing a second side surface of the light guide plate which is adjacent to the first side surface; and combining a portion of the bracket with the combining member of the receiving container, such that the light guide plate and the receiving container are removably disposed with each other, wherein the light guide plate comprises a light emitting surface, and a bottom surface opposing the light emitting surface, and the first and second side surfaces connect the light emitting and the bottom surfaces of the light guide plate to each other.

20. The method of claim 19, wherein the attaching a bracket comprises disposing a transparent adhesive member between the bracket and the first surface of the light guide plate, the transparent adhesive member attaching the bracket to the light guide plate.

* * * * *